Patented June 24, 1947

2,422,658

UNITED STATES PATENT OFFICE 2,422,658

AMINE SALTS OF DINITROPHENOLS

Gerald H. Coleman and Frank B. Smith, Midland, Mich., assignors to The Dow Chemical Company, Midland, Mich., a corporation of Michigan No Drawing. Application November 21, 1941, Serial No. 419,856

3 Claims. (Cl. 260—567.5)

This invention relates to amine salts of phenols, and is particularly concerned with the addition products of dinitro-phenols with N-aralkyl-alkylamines and to parasiticidal compositions comprising such amine salts as active toxicants. These salts have the formula:

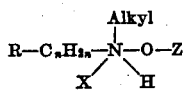

wherein R represents an aromatic radical of the benzene or naphthalene series, X represents hydrogen or alkyl, $n$ is an integer, and Z represents a dinitro-aryl radical of the benzene series. In the following specification and claims wherever the expression "alkylamine" or "N-aralkyl-alkylamine" or similar term is employed without limitation of the term "alkyl" to mono- or di-alkyl, it is to be understood that "alkyl" is employed in a generic sense to include both mono- and di-alkyl compounds.

We have prepared representative members of the above-identified group of addition compounds and found them to be crystalline solids, yellow to orange-red in color, somewhat soluble in organic solvents, and relatively insoluble in water. These compounds are stable to light and air, not appreciably affected by carbon dioxide, and noncorrosive to the skin of humans.

A preferred group of amine salts which are particularly valuable for use in insecticidal and fungicidal compositions because of their exceptionally low solubility in water are the N-aralkyl-alkylamine salts of dinitro-phenols having the formula:

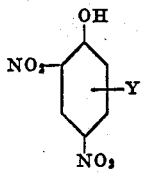

wherein Y represents cycloalkyl, aralkyl, aryl, or an alkyl radical or hydrogen. The term "aryl" as herein employed is defined as any univalent aromatic hydrocarbon radical, as phenyl or tolyl, whose free valence belongs to the nucleus and not to a side-chain.

The new compounds are prepared by reacting a suitable amine compound such as N-benzyl-ethylamine, N-(gamma-phenyl-propyl)-diamyl-amine, N-benzyl-octylamine, etc. with a dinitro-phenol. Substantially equimolecular proportions of the dinitro-phenol and amine have been found to give the desired salts in good yield. Where an excess of one of the other reactant is employed, separation is readily accomplished by extraction of the crude salt product with benzene or other selective solvent for the dinitro-phenol and amine or for the amine salt. In many instances the crude reaction product consisting essentially of the amine salt is adapted to be employed as a parasiticidal toxicant without further purification.

A preferred method of operation comprises carrying out the reaction in the presence of an organic solvent such as benzene, chlorobenzene, toluene, or alcohol. The operating temperatures are not critical, although a minimum amount of solvent is required when the reaction is carried out at somewhat elevated temperatures, e. g. between about 40° and 120° C., and conveniently at the refluxing temperature of the reaction mixture.

To ensure the formation of a relatively homogeneous product and to minimize occlusion, the reactants are preferably mixed portionwise with stirring over a short period of time. Following completion of the reaction, the mixture is filtered or otherwise manipulated to separate out the desired amine salt compound. Since the desired products are for the most part solids, such separation may comprise recrystallization or washing with solvent to remove unreacted residues of amine or dinitro-phenol. Should the product be liquid, the reaction mixture may be warmed to drive off the solvent of reaction and the residue dispersed in a preferential solvent to extract out unreacted phenol or amine remaining therein.

The following examples set forth certain embodiments of the invention but are not to be construed as limiting the same.

Example 1

25.2 grams (0.1 mole) of 2.4-dinitro-6-cyclohexyl-phenol was dispersed in hot benzene and 16.3 grams (0.1 mole) of N-benzyl-diethylamine added portionwise thereto with stirring. The mixture was then heated to its boiling temperature with stirring and thereafter cooled, filtered, and the filtration residue washed with a mixture of equal parts by volume of benzene and petroleum ether. The resulting product consisted of 35.5 grams of the N-benzyl-diethylamine salt of 2.4-dinitro-6-cyclohexyl-phenol as yellow crystals melting at 121°–121.5° C. This compound was soluble in methyl-ethyl ketone and somewhat soluble in kerosene. A saturated water solution at 26° C. contained 0.0135 gram of the compound per 100 milliliters and had a pH of 6.7.

Example 2

20.1 grams (0.075 mole) of 2.4-dinitro-6-normal-hexyl-phenol was dispersed in 20 grams of benzene. 12.3 grams of N-benzyl-diethylamine was added to the mixture with stirring whereupon appreciable heat of reaction was evolved. The reaction mixture was then heated to the boiling temperature and thereafter cooled and filtered. The solid residue from the filtration was recrystallized from ethyl alcohol, washed with cold ethyl alcohol, and dried to obtain 23.5 grams of the N-benzyl-diethylamine salt of 2.4-dinitro-6-normal-hexyl-phenol as yellow crystals melting at 73°–76° C. A saturated water solution at 24° C. contained 0.01 gram of the compound per 100 milliliters and had a pH of 6.4.

Example 3

19.8 grams (0.1 mole) of 2.4-dinitro-6-methyl-phenol was dissolved in 60 milliliters of hot ethyl alcohol and 16.3 grams (0.1 mole) of N-benzyl-diethylamine added portionwise thereto with stirring. The mixture was heated on a steam bath for a short period of time, and then cooled and filtered. The residue from the filtration was washed with cold ethyl alcohol and dried, whereby there was obtained 32.5 grams of the N-benzyl-diethylamine salt of 2.4-dinitro-6-methyl-phenol as bright yellow crystals melting at 101°–103° C. This compound was somewhat soluble in ethanol, slightly soluble in carbon tetrachloride, and substantially insoluble in kerosene. A saturated water solution at 29° C. contained 0.203 gram of the compound per 100 milliliters and had a pH of 6.3.

Example 4

8.15 grams (0.05 mole) of 2.4-dinitro-6-cyclohexyl-phenol was dissolved in 50 milliliters of 95 per cent ethanol and 13.3 grams (0.05 mole) of N-benzyl-normal-butylamine added portionwise thereto with stirring. The mixture was heated on a steam bath for a short period and thereafter cooled and filtered. The residue from the filtration was washed with cold ethyl alcohol and dried to obtain 20 grams of N-benzyl-normal-butylamine salt of 2.4-dinitro-6-cyclohexyl phenol as an orange crystalline compound melting at 141°–141.5° C. This compound was somewhat soluble in ethyl alcohol, slightly soluble in carbon tetrachloride, and very slightly soluble in kerosene. A saturated water solution at 26° C. contained 0.015 gram of the compound per 100 milliliters and had a pH of 6.7.

Example 5

10 grams (0.051 mole) of 2.4-dinitro-6-methyl-phenol and 6.17 grams (0.051 mole) of N-benzyl-methylamine were mixed together and heated at 50°–60° C. with stirring to obtain a homogeneous liquid mixture. Upon cooling the mixture became solid and was recrystallized from chlorobenzene to obtain the N-benzyl-methylamine salt of 2.4-dinitro-6-methyl-phenol, a yellow compound melting at 132°–132.5° C. This compound was difficultly soluble in kerosene and carbon tetrachloride, very soluble in ethyl alcohol, and soluble in water to the extent of 0.164 per cent at 25° C.

Example 6

18.4 grams of 2.4-dinitro-phenol was dissolved in 20 milliliters of hot benzene. 21.9 grams (0.1 mole) of N-benzyl-dinormalbutylamine was added portionwise to the phenol solution with stirring. The reaction mixture was then cooled to 10° C. and filtered to obtain 34.5 grams of the N-benzyl-dinormalbutylamine salt of 2.4-dinitro-phenol as a bright yellow crystalline product melting at 65°–67° C. This compound was difficultly soluble in kerosene, very slightly soluble in water, and soluble in both ethyl alcohol and carbon tetrachloride.

Example 7

10.5 grams (0.06 mole) of N-alphaphenylethyl-normal-amylamine and 14.3 grams (0.06 mole) of 2.4-dinitro-6-cyclohexyl-phenol were dissolved in hot benzene with stirring. The mixture was then cooled to below 0° C. and filtered. The residue from the filtration was washed with cold benzene and air dried to obtain 21.5 grams of the N-alphaphenylethylnormal-amylamine salt of 2.4-dinitro-6-cyclohexyl-phenol as a bright orange crystalline solid melting at 115°–117° C. This compound was soluble in carbon tetrachloride and 95 per cent ethanol and relatively insoluble in kerosene. 0.015 gram of the compound is soluble in 100 grams of water at 25° C. The pH of the saturated aqueous solution was 6.6.

Example 8

In a similar manner 8 grams (0.03 mole) of N-$\beta$-phenylethyl-dibutylamine and 9.13 grams (0.03 mole) of 2.4-dinitro-6-cyclohexyl-phenol were reacted together in benzene to obtain 15.3 grams of N-$\beta$-phenylethyl-dibutylamine salt of 2.4-dinitro-6-cyclohexyl phenol as yellow crystals melting at 97.5°–98.5° C. This compound was soluble in carbon tetrachloride and 95 per cent ethanol and difficultly soluble in kerosene. 0.047 per cent by weight of the compound was soluble in water at 25° C.

The N-aralkyl-alkylamine addition salts of dinitro-phenols as set forth in the preceding examples may be used as active toxicants in parasiticidal compositions. In such use the compounds are preferably employed in combination with an inert carrier. While all of these compounds exert a definite insecticidal and fungicidal action, the salts of 2.4-dinitro-phenols have been found particularly well adapted for use in parasiticidal spray or dust compositions. These compounds are sufficiently insoluble in water and have such a low volatility that they are not readily dissipated from the plant surfaces and provide protection against insect, mite, and fungous pests over a comparatively long period of time.

When employed in dust mixtures, the amine salts are dispersed in or on solid finely divided inert carriers such as diatomaceous earth, volcanic ash, bentonite, talc, finely divided wood flour and the like. Compositions comprising from about 0.5 to 5 per cent by weight of such salt are particularly useful.

Mixtures of the amine salts with inert carriers may also be suspended in water and employed as agricultural sprays. In preparing dust mixtures for use in such aqueous compositions, the amine salts may be employed in amounts up to 80 or 90 per cent by weight of the finely divided solid concentrate, although from about 15 to about 25 per cent by weight is preferred. Similarly, aqueous solutions or dispersions of the amine salts or solutions or dispersions thereof in such solvents as alcohol, carbon tetrachloride and petroleum distillate are useful in parasiticidal and bactericidal control.

Various wetting, sticking, and dispersing agents such as glyceryl oleate, alkali metal caseinates, aluminum naphthenate, alkali metal salts of sulfonated aromatic hydrocarbons and phenols, sodium lauryl sulphate, partially neutralized sulfuric acid derivatives of fatty acids and oils, blood albumen, soap, and the like may be employed in combination with the new amine salts. The relatively insoluble nature of these salts renders them particularly valuable for combination with other insecticidal and fungicidal agents such as petroleum, fish, and vegetable oils, lead arsenate, sulfur, copper sprays, pyrethrum, rotenone, etc., for the control of various insect and fungous pests.

The following examples illustrate compositions comprising the new amine salts as active toxicants.

Example 9

78 parts by weight of the N-benzyl-diethylamine salt of 2.4-dinitro-6-cyclohexyl-phenol and 22 parts by weight of sodium lauryl sulfate were mixed and ground together to form a parasiticidal concentrate. 0.5 pound of this mixture was dispersed in 100 gallons of water and the resulting spray composition applied for the control of Colorado potato beetle larva. This treatment gave an 82.2 per cent kill of the test organism in two days. In a check determination, acid lead arsenate at 3 pounds per 100 gallons of water killed only 47.1 per cent of the potato beetle larva.

Example 10

One part by weight of the N-benzyl-diethylamine salt of 2.4-dinitro-6-methyl-phenol and 99 parts by weight of finely divided pyrophyllite were ground and mixed together to form a dusting composition. This product was applied to the surface of a luxuriant growth of a wood destroying organism of the type of *Fomes annosus* and identified as Forest Products Laboratory Culture #517 in the amount of 1.4 milligrams per square centimeter. A growth inhibition of 99 per cent was obtained.

While the foregoing examples have been primarily concerned with salts of 2.4-dinitro-6-cyclohexyl-phenol, 2.4-dinitro-6-normal-hexyl-phenol, 2.4-dinitro-6-methyl-phenol, and 2.4-dinitro-phenol, the salt of other dinitro-phenols are included within the scope of the present invention. Representative of the phenols which may be substituted for those shown in the examples to obtain the corresponding amine salts, are 2.4-dinitro-5-cyclohexyl-phenol, 2.5-dinitro-4-cyclohexyl-phenol, 2.6-dinitro-4-methyl-phenol, 2.4-dinitro-3.6-dimethyl-phenol, 2.4-dinitro-6-benzyl-phenol, 2.4-dinitro-6-$\beta$-phenylethyl-phenol, 2.4-dinitro-6-phenyl-phenol, 2.4-dinitro-6-laurylphenol, etc. Similarly, other amines may be substituted for those shown, e. g. N-(4-methylbenzyl) ethylamine, N-(2-cyclohexyl-benzyl)-diisopropylamine, N-gamma-phenylpropyl-normal-octylamine, N-benzyl-isopropylamine, N-benzyl-laurylamine, N-phenyloctyl-diethylamine, N-4-chlorobenzyl-dimethylamine, N-$\beta$-(alphanaphthyl) ethyl-normal-hexylamine, etc.

Other parasites which may be controlled with compositions comprising the new amine salts include aphids, red spider, cabbage worm, army worm, thrips, and the like, as well as various fungous and wilt organisms.

We claim:

1. An N-benzyl-alkylamine salt of 2.4-dinitro-6-cyclohexyl-phenol.

2. N-benzyl-diethylamine salt of 2.4-dinitro-6-cyclohexyl-phenol.

3. N-benzyl-normalbutylamine salt of 2.4-dinitro-6-cyclohexyl-phenol.

GERALD H. COLEMAN.
FRANK B. SMITH.

REFERENCES CITED

The following references are of record in the file of this patent:

UNITED STATES PATENTS

| Number | Name | Date |
|---|---|---|
| 2,189,420 | Hockenyos | Feb. 6, 1940 |
| 2,222,486 | Moore | Nov. 19, 1940 |
| 2,225,618 | Britton et al. | Dec. 24, 1940 |

OTHER REFERENCES

Buehler et al., Jour. Am. Chem. Soc., 48, 3168–72, (1926).